US012740575B2

(12) United States Patent
Xu et al.

(10) Patent No.: US 12,740,575 B2
(45) Date of Patent: Sep. 22, 2026

(54) METHOD OF EFFICIENTLY SEPARATING SOLID FAT FROM POLYUNSATURATED FATTY ACID GREASE

(71) Applicant: Zhejiang Keming Biopharmaceutical Co., Ltd, Shaoxing (CN)

(72) Inventors: Xinde Xu, Shaoxing (CN); Shengfan Wang, Shaoxing (CN); Jian Zhao, Shaoxing (CN); Hongjuan Chao, Shaoxing (CN)

(73) Assignee: Zhejiang Keming Biopharmaceutical Co., Ltd, Zhejiang Province (CN)

( * ) Notice: Subject to any disclaimer, the term of this patent is extended or adjusted under 35 U.S.C. 154(b) by 544 days.

(21) Appl. No.: 18/328,805

(22) Filed: Jun. 5, 2023

(65) Prior Publication Data

US 2023/0397630 A1 Dec. 14, 2023

(30) Foreign Application Priority Data

Jun. 8, 2022 (CN) ......................... 202210651634.8

(51) Int. Cl.
*A23D 9/04* (2006.01)
*A23D 9/007* (2006.01)

(52) U.S. Cl.
CPC ............... *A23D 9/04* (2013.01); *A23D 9/007* (2013.01)

(58) Field of Classification Search
CPC ................................. A23D 9/04; A23D 9/007
See application file for complete search history.

(56) References Cited

U.S. PATENT DOCUMENTS

2013/0274495 A1* 10/2013 Murai .................... A23D 9/007 554/175
2018/0236383 A1* 8/2018 Birmingham ...... B01J 20/28069

* cited by examiner

*Primary Examiner* — Erik Kashnikow
*Assistant Examiner* — Assaf Zilbering
(74) *Attorney, Agent, or Firm* — Ashok Tankha

(57) ABSTRACT

A method of efficiently separating solid fat from polyunsaturated fatty acid grease (PFAG) comprises adding a small amount of inert material to the PFAG, and cooling crystallization, and then adding a certain amount of inert material under stirring, and filtering to obtain clarified PFAG, at the same time collecting a filter cake, heating and dissolving the filter cake, and then filtering, recovering a filtrate to obtain a solid fat. The method can be efficiently separated saturated and low-saturated fatty acids from PFAG. In the process, winterization crystallization time is short, crystallization is complete, the crystal separation is easy. It will not cause some solid fat melted and thus re-enter filtrate due to long separation and blowing dry in conventional process. The yield of final product is high up to 96.3%-98.2%. After winterization, a lipid clarity of PFAG is good, and no crystal precipitation would occur at 0° C. for 5 hrs.

7 Claims, No Drawings

METHOD OF EFFICIENTLY SEPARATING SOLID FAT FROM POLYUNSATURATED FATTY ACID GREASE

CROSS-REFERENCE TO RELATED APPLICATIONS

This application claims priority to and the benefit of the non-provisional patent application titled "A Method Of Efficiently Separating Solid Fat From Polyunsaturated Fatty Acid Grease", application number 202210651634.8, filed in the Chinese Patent Office on Jun. 8, 2022. The specification of the above referenced patent application is incorporated herein by reference in its entirety.

FIELD OF THE INVENTION

The present invention mainly describes a method of efficiently separating solid fat from polyunsaturated fatty acid grease, in particular, the method comprises adding a small amount of inert material to the polyunsaturated fatty acid grease, and stirring slowly, cooling crystallization, and then adding a remaining inert material under stirring, and filtering to obtain a clarified polyunsaturated fatty acid grease, at the same time collecting a filter cake, heating to dissolve and then filtering the filter cake, a filtrate obtained is a solid fat. This method not only improves the clarity of the polyunsaturated fatty acid grease, but also efficiently collects and obtains the solid fat. It is suitable for winterizing operation of one or more polyunsaturated fatty acid mixtures including fish oil (directly extracted ω-3 polyunsaturated fatty acid), algal oil (fermented-3 polyunsaturated fatty acid), linoleic acid, conjugated linoleic acid, linolenic acid, arachidonic acid, etc. The present invention belongs to the field of biological chemical industry.

BACKGROUND

As people are increasingly concerned about their own health, the public is starting to take more nutritious and healthy dietary supplements. Polyunsaturated fatty acid (PUFA) products play an important role on them. Polyunsaturated fatty acid is referred to as fatty acids containing at least two double bonds in the molecular structural formula. The existing forms include fatty acid ethyl ester, fatty acid methyl ester, fatty acid glyceride, and free fatty acid, etc.

Polyunsaturated fatty acid (PUFA) is the metabolism, especially is an important material basis in infant brain development and other activities, and is a component of cell membrane. Polyunsaturated fatty acid (PUFA) mainly plays physiological functions on maintaining cell membrane fluidity, promoting cholesterol esterification, reducing cholesterol and triglycerides, reducing blood viscosity, and improving blood circulation. At the same time polyunsaturated fatty acid (PUFA) also has the functions of improving human thinking and enhancing memory. However, the human body can not synthesize polyunsaturated fatty acid (PUFA) by itself, and polyunsaturated fatty acid (PUFA) must be obtained through diet, etc.

There are various types of polyunsaturated fatty acid (PUFA), mainly including ω-3 polyunsaturated fatty acid (PUFA) (ω-3 PUFA), ω-6 polyunsaturated fatty acid (PUFA) (ω-6 PUFA), ω-9 polyunsaturated fatty acid (PUFA) (ω-9 PUFA) and other forms, in particular including α-linolenic acid (ALA), eicosapentaenoic acid (EPA), docosahexaenoic acid (DHA), docosapentaenoic acid (DPA), linoleic acid (LA), conjugated linoleic acid (CLA), γ-linolenic acid (GLA), arachidonic acid (AA), etc. Among them, the ω-3 polyunsaturated fatty acid (ω-3 PUFA) represented by eicosapentaenoic acid (EPA) and docosahexaenoic acid (DHA) are the most well-known and accepted by the public, and have the most obvious improvement and promotion effects on human and animal health. The molecular structure formula of some polyunsaturated fatty acid is as follows:

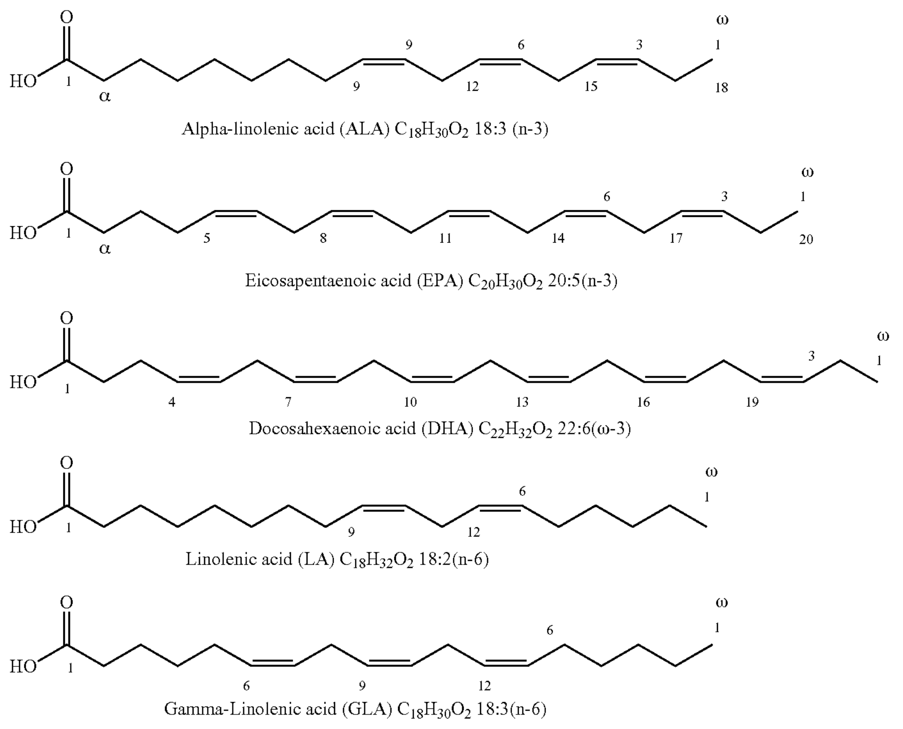

Alpha-linolenic acid (ALA) $C_{18}H_{30}O_2$ 18:3 (n-3)

Eicosapentaenoic acid (EPA) $C_{20}H_{30}O_2$ 20:5(n-3)

Docosahexaenoic acid (DHA) $C_{22}H_{32}O_2$ 22:6(ω-3)

Linolenic acid (LA) $C_{18}H_{32}O_2$ 18:2(n-6)

Gamma-Linolenic acid (GLA) $C_{18}H_{30}O_2$ 18:3(n-6)

-continued

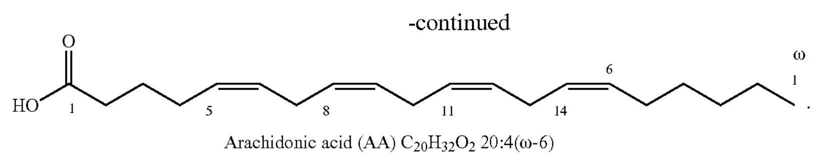

Arachidonic acid (AA) $C_{20}H_{32}O_2$ 20:4(ω-6)

Polyunsaturated fatty acid is mainly derived from algae extract and aquatic animal oil, wherein one of the important sources is fish oil. Due to the fatty acid composition in polyunsaturated fatty acid grease is relatively complex, containing saturated, monounsaturated and polyunsaturated fatty acid, etc. The melting point of these fatty acid is quite different. Saturated fatty acids such as C16:0, C18:0, C20:0, etc. will condense into a solid state at 10° C. or even around 20° C. Monounsaturated or diunsaturated fatty acids such as C16:2, C18:1 and C18:2 do not precipitate at 0° C. Polyunsaturated fatty acid such as C16:4, C18:3, C20:4, C20:5 and C22:6 remains in a clarified state below −10° C. The so-called solid fat is referred to as saturated fatty acids such as C16:0, C18:0 and C20:0, and even low saturation fatty acids such as C16:2, C18:1 and C20:1 are a type of substances with a relatively high melting point.

Polyunsaturated fatty acid generally has good effects of softening blood vessels and reducing triglycerides. Saturated fatty acids do not have such physiological functions. So most of polyunsaturated fatty acid, especially functional polyunsaturated fatty acid, such as fish oil and conjugated linoleic acid, etc., are mainly used in the field of dietary supplements. In the field of dietary supplements, the polyunsaturated fatty acid is often taken in the form of clear soft capsules. From the perspective of appearance, it is also required that the contents of soft capsules should be as transparent as possible. Polyunsaturated fatty acid and related product are produced in industry, the final product standards all have certain requirements for product clarification, such as colorless to light yellow transparent liquid. So the industrial production process of polyunsaturated fatty acid basically includes the winterization process. The main purpose is to remove saturated components in polyunsaturated fatty acid, or low saturated components with fewer double bonds such as solid fat, to improve its physiological effects and maintain its clarity.

Saturated fatty acids or low unsaturated fat acids (containing one-two double bonds in the molecular structure formula) are useful in supplementing animal fat and providing energy and widely used in food or animal feed fields, or be used for other industrial purposes.

In industrial production, especially in preparing polyunsaturated fatty acid raw materials used in soft capsules, polyunsaturated fatty acid is generally winterized to remove saturated and low-saturated components of fatty acids. In other words, the polyunsaturated fatty acid is cooled to 0° C. or below 0° C. for a period of time to precipitate fatty acid crystals at a temperature of lower than 0° C. or below 0° C. of the freezing point, and then remove fatty acids (solid fat) precipitated by filtration. In this process, it is very critical operating steps how to make saturated or low-saturated components fully crystallizated and precipitated and ensure polyunsaturated components not to precipitated as much as possible to ensure product yield, and how to effectively separate saturated or low-saturated components (solid fat) crystallizated and precipitated from polyunsaturated fatty acid without crystallization.

For fats with more medium and low carbon chain saturated fatty acids component (such as C12:0, C14:0 and C16:0) in fatty acid composition, due to these medium and low carbon chain saturated fatty acids having high freezing point, they are easy to crystallize and precipitate, to obtain coarse crystals. It is also easier to separate during the subsequent crystallization process. However, for those fatty acid composition having not many medium and low carbon chain saturated fatty acids components and only containing a small amount of medium and long carbon chain low saturated fatty acids (such as C18:1, C19:2, C20:1, C20:2, C21:1, C21:2, etc.). On the one hand, due to fewer crystal seeds during the cooling crystallization process, the crystallization temperature is required to be low, resulting in crystallization precipitation difficult, crystallization slowly, and sometimes even incomplete precipitation, and thus it can not achieve effects of winterization crystallization. On the other hand, the subsequent crystallization separation process is relatively difficult, because it requires long-term pressure filtration through separation methods such as plate and frame filtration. In order to dry filter cakes, compressed air or nitrogen gas must be used for long-term blowing in the future. In this process, part of the crystals in the plate and frame filtration will dissolve due to rise temperature, and then re-enter unsaturated components. So it leads to unsatisfactory final winterization effects.

In addition, for these medium and long carbon chain fatty acids merely containing a small amount of low saturated fatty acids, on the one hand, the number of crystals produced during winterization is relatively small, and then it can not form a fixed shape filter cake during filtration; on the other hand, due to the melting point of low saturated components is relatively low, it is easy to remelt in the air. It leads to easily partial melting when unloading slag from the board and frame, Consequently it results in incomplete discharge of filter cakes when unloading and partially adheres to the plate frame filter cloth. So it will reduce the winterization effect and efficiency. The adhered low-melting point components are easy to melt and then enter the filtrate of unsaturated fat components after winterization in the next batch. Consequently it reduces the winterization efficiency, moreover, and reduces the process economy due to the inability to effectively reuse the precipitated low saturation component solid fats.

In the prior art, there are a lot of researches to improve the winterization crystallization efficiency and separation efficiency of polyunsaturated fatty acid from the aspect of process or equipment innovation.

CN12552198A discloses a secondary slow cooling fish oil winterization process and the filter equipment used. The precipitation rate of high freezing point fish oil is high by cooling stirring, standing for crystal growth, filtering crystal removal, the precipitated fish oil crystals are not easy to remelt, and the crystals are separated by a complicated customized equipment. The equipment has a small filtering area, complex design and low separation efficiency, in particular, it is difficult to crystallize and separate for low saturation crystalline components merely containing a small amount of freezing point.

CN205501251A describes a simple device for winterizing fish oil, which achieves heating dissolution and cooling crystallization of fish oil in the same tank, and achieves winterizing filtration. This device needs to achieve heating, cooling, and filtration processes within a set of equipment, with relatively small heat exchange and filtration areas, low efficiency, long operation time, and poor practicality in production.

CN103740462B discloses to a method of oil refining, including the desaturated fat process. In particular, the oil that has undergone impurity removal, degumming, acid removal, and deodorization is further heated and dissolved in a winterization tank, cooled and crystallized in stages. After long-term crystallization, it is filtered by a winterization filter to obtain a refined oil without saturated fats. In this process, a crystal maintenance time of crystallization is very long, filtration is difficult and production efficiency is low.

CN206529439U published a fish oil crystallization reaction tank for winterization, fractionation and crystallization. The problem of difficult odor escape during winterization, fractionation and crystallization is solved and the heat transfer efficiency is improved, by bubbling nitrogen gas into the crystallization process during winterization. But this equipment does not describe the separation process of crystallization, and also has the drawbacks of slow separation speed and long time.

CN109897726A discloses a pressing process for extracting tea oil from tea oil seeds, including processing, pressing, filtering, degumming, dewaxing, deacidification and other processes in the early tea oil seeds stage. In the dewaxing process, more crystallization promoting and filtration aids are added at one time, and activated carbon and perlite are used to simultaneously promote crystallization and filtration. But adding a large amount of crystal promoting agents at once will inevitably lead to more crystal precipitation. Many fatty acids that should not precipitate at the crystallization temperature will be adsorbed on the promoter, greatly reducing the yield of the final product.

In general, there are several defects in the previous winterization refining technology of oil and fat. 1) Low crystallization efficiency. In particular, for raw materials with low content of saturated fatty acids and only a small amount of low freezing point saturated fatty acids, due to the difficulty in crystal precipitation and fewer crystal seeds, the efficiency of winterization crystallization is lower. 2) Low separation efficiency of precipitated crystals. Fatty acids and fats themselves are relatively difficult to separate. If the main components of these fats are low saturated fatty acids, due to their low freezing point and small amount, it is difficult to achieve rapid and complete separation between the filtrate and the fat when filtered by plate frame or other methods. Moreover, during a long separation process, some low freezing point solids are easily re dissolved into the filtrate, thereby reducing the quality of the clarified liquid and winterizing efficiency. 3) One-time addition of crystal promoting filter aids greatly reduces the yield of the final product. 4) The precipitated solid fat is not well recycled and has low economic efficiency.

SUMMARY OF THE INVENTION

In view of previous technical defects, it is necessary to find a method of making saturated and low-saturated fatty acids in oils efficiently winterized and crystallized, and to achieve efficient separation. It can realize the recycling of solid fat separated from the winterization results and enhance the economy.

In order to achieve the above purposes, the present invention provides a method of efficiently separating solid fat from polyunsaturated fatty acid grease. In particular, adding a small amount of inert solid powder to the polyunsaturated fatty acid grease before winterization. The small amount of the inert solid powder may be used as crystal seeds. The crystal seeds are conducive to crystallization of saturated or low-saturated components in the oils when cooling, and the crystals grow during crystallization, so as to overcome the shortcomings of slow crystal precipitation and long crystal growth time. After crystallization formation, adding a certain amount of inert solid powder. The inert solid powder may be used as a filter aid during crystal separation. The inert solid powder is conducive to efficient separation of crystals, in order to avoid the crystals remelted to enter the filtrate during the long-term filtration process, and reduce the winterization effect and efficiency of the final product. And then reheat and dissolve the filter cake obtained after filtration, and then filter it while it is hot. The filtrate obtained is solid fat. The filter cake (inert solid powder) after separating the solid fat can be used again.

The method of the present invention comprises the following steps: a) adding a small amount of inert solid powder to a heated melted polyunsaturated fatty acid grease, and stirring evenly, the inert solid powder is selected from the group consisting of activated carbon, activated clay, diatomite and perlite; b) cooling crystallization the polyunsaturated fatty acid grease containing the inert solid powder obtained by step a), to obtain a crystalline liquid; c) adding a certain amount of inert solid powder to the crystalline liquid obtained by step b), and stirring evenly, to obtain a solid-liquid mixture; d) filtering the solid-liquid mixture obtained by step c), to obtain a clarified polyunsaturated fatty acid grease and a filter cake; e) putting the filter cake obtained by step d) into a reactor and then heating to dissolve, to obtain a solid-liquid mixture containing the inert solid powder; and f) filtering the solid-liquid mixture obtained by step e), to obtain a solid fat filtrate in molten state and a filter cake containing the inert solid powder.

Wherein the solid fat is referred to as saturated and low saturated fatty acid components in the polyunsaturated fatty acid grease, such as C12:0, C14:0, C16:0, C18:1, C19:2, C20:1, C20:2, C21:1, C21:2, and so on. The freezing point of the fatty acid is higher than that of the polyunsaturated fatty acid.

In the preferred technical solution of the method of the present invention, preferably, the polyunsaturated fatty acid grease is selected from the group consisting of fish oil, algal oil, linoleic acid, conjugated linoleic acid, linolenic acid and arachidonic acid. Preferably, the polyunsaturated fatty acid may exist in the form of methyl ester, ethyl ester, glycerol ester, or free fatty acid.

In the preferred technical solution of the method of the present invention, preferably, in step a), a melting temperature of the polyunsaturated fatty acid grease is 30-100° C. So this makes the oil completely clear and transparent. Preferably, in step a), before crystallizing, an additive amount of the inert solid powder is 0.1-1.0% (w/w) of a mass of the polyunsaturated fatty acid grease.

In the preferred technical solution of the method of the present invention, preferably, a temperature of cooling crystallization is −10-5° C. And preferably it maintains 0.5-3.0 hours of crystal grown to form a crystalline liquid. Since there is a small amount of inert solid powder in the molten fatty acid grease, the powder plays a function of crystal seed in a sense, the saturated components and low-saturated components (solid fat) in fatty acid oils are easy to precipitate in the form of crystallization. And the crystal growth is good and the crystal shape is thicker, and it is conducive to the subsequent separation process.

In the preferred technical solution of the method of the present invention, preferably, in step c), after completing crystallization, adding a certain proportion of the inert solid powder to the crystalline liquid, and stirring evenly. Wherein, after crystallizing, an additive amount of the inert solid powder is 0.5-4.0% (w/w) of a mass of the polyunsaturated fatty acid grease.

The crystalline liquid including inert solid powder will be separated by conventional methods such as a plate and frame pressure filtration, a centrifugal filtration or a vacuum filtration to achieve solid-liquid separation. Due to the filtration assistance of inert solid substances, solid-liquid separation is very easy. Conventional winterization crystallization methods without adding inert substances often require more than 10 hrs, sometimes even about 24 hrs, to achieve solid-liquid separation. In the later stage, a large amount of nitrogen or compressed air is needed to blow dry residual liquid grease in the crystals. On the one hand, it causes unnecessary waste. On the other hand, partly precipitated crystals will remelt to enter the filtrate during a long-term filtration or blow drying process. It greatly reduces the winterization crystallization effect. Using the process of the present invention, due to add inert solid powders, the crystal precipitated in the early stage is thicker and adsorbed to the inert powder medium. Coupled with the filtration aid of inert powders, it is easier to achieve solid-liquid separation. The research found that under the condition of the same filtration area, the solid-liquid separation time is more than twice as short as conventional methods, generally about 3 hrs. In addition, only a small amount of nitrogen or compressed air can be used to blow dry the filter cake.

More importantly, creative batch addition of inert solid powders can not only fully precipitate low saturation long-chain fatty acids (solid fat) and will not lead to precipitation of the polyunsaturated fatty acid that should not be precipitated due to too many crystal species, so as to reduce the yield of the final product and improve separation efficiency of solid fat. If a certain amount of inert solid powder is not added in the later stage, the inert solid powder in the early stage is not enough to play the role of filtration. However, if the inert solid powder are added at one time before cooling crystallization, the yield of the final product will be greatly reduced. Therefore, depending on different compositions of fatty acids in polyunsaturated fatty acid and different final goals to be achieved, the batch addition of inert solid powder in a certain proportion can have an unexpected effect. It can not only improve the removal efficiency of solid fat, but also ensure the yield of products.

In the preferred technical solution of the method of the present invention, preferably, in step e), a temperature of putting the filter cake into the reactor for heating and dissolving is 40-100° C. After melting, the inert medium is dispersed in the melted solid fat.

Then the solid fat containing inert media and melted state is filtered while hot, and the filtrate solid fat is recovered. The filter cake is an inert medium. The recovered solid fat can be used for food, feed or other industrial uses. The recovered filter cake is an inert medium, which can be stored under nitrogen and then re-used for winterization crystallization of next batch of fatty acid fats.

The method of the present invention can be efficiently separated saturated and low-saturated fatty acids from polyunsaturated fatty acid grease. In the process, the winterization crystallization time is short, the crystallization is complete, the crystal separation is easy. It will not cause some solid fat melting and re-entering the filtrate due to long separation and blowing dry time in conventional process. The yield of final products is high, but also, after winterization, the lipid clarity of the polyunsaturated fatty acid grease is good, and no crystal precipitation would occur at 0° C. for 5 hrs. The inert medium added during the process can be applied repeatedly, without additional solid waste, and good environmental protection.

DETAILED DESCRIPTION OF THE INVENTION

Hereafter, the present invention will be described specifically with reference to examples. The examples are given only for illustration of the technical solution of the present invention and should not be construed to limit the present invention.

Example 1

Dissolve 1500 g of ethyl ester type polyunsaturated fatty acid fish oil raw material (EPA 24.3%, DHA 6.9%, a total content of polyunsaturated fatty acid is 34.2%, color orange red) under keeping warm at 65° C. for 0.5 hrs, and then add 7.5 g of activated clay to obtain a mixture. Afterwards, cool the mixture for winterization crystallization to make a temperature lowered from 65° C. to −2.5° C. within 30 minutes. And then keep warm for crystal growth for 20 minutes. Then add 45.0 g activated clay and 15 g activated carbon under stirring for 0.5 hrs to obtain a crystalline liquid.

Filter the crystalline liquid containing activated clay and activated carbon through a plate and frame filter to obtain a filter cake. No obvious filtrate is seen after 5 minutes. And then blow dry the filter cake with nitrogen. No filtrate droplet is flowed out after 3 minutes. Collect a filtrate and weigh 1461.2 g with the yield of 97.3%.

Take 20 ml of the filtrate and keep warm at 0° C. for 5 hrs. The filtrate is still clear and transparent. This shows that the effect of winterization is very good.

Remove the plate and frame to form a filter cake with a cake shape and relatively dry. And then heat the filter cake under stirring in a reactor up to 80° C. to make the filter cake (solid fat) melted, and then filter through a plate and frame filter to obtain a filter cake, and blow dry the filter cake with nitrogen, finally recover 27.8 g of a filtrate (solid fat). The filter cake may be used for the next winterization process.

Compare Example 2

Dissolve the same raw materials as that of Example 1 under keeping warm at 65° C. for 0.5 hrs to obtain a mixture, and then slowly cool for winterization crystallization the mixture to make a temperature lowered from 65° C. to −2.5° C. within 2.5 hrs. And then keep warm for crystal growth for 2 minutes to obtain a crystalline liquid. Filter the crystalline liquid through a plate and frame filter of Example 1 in a slow filtration rate to obtain a filter cake. A small amount of filtrate is still flowed out after 3.0 hrs. The filtrate is cloudy in the late stage. This indicates that a small amount of solid fat is remelted. Remove the plate and frame after 3.5 hrs. A quantity of the filter cake is small and can not formed. Take 20 ml of the filtrate and keep warm at 0° C. for 5 hrs. There are crystals precipitated at the bottom. This shows that the effect of winterization is not ideal.

Compare Example 3

Dissolve the same raw materials as that of Example 1 under keeping warm at 65° C. for 0.5 hrs to obtain a mixture, and then add 52.5 g activated clay and 15 g activated carbon to obtain a mixture, and slowly cool the mixture for winterization crystallization to make a temperature lowered from 65° C. to −2.5° C. within 2.5 hrs, a large number of crystals are precipitated, and the crystals are kept warm for crystal growth for 20 minutes to obtain a crystalline liquid.

Filter the crystalline liquid containing activated clay and activated carbon through a plate and frame filter to obtain a filter cake. No obvious filtrate is seen after 8 minutes. And then blow dry the filter cake with nitrogen. No filtrate droplet is flowed out after 5 minutes. Collect a filtrate and weigh 1297.5 g with the yield of 86.5%.

Take 20 ml of the filtrate and keep warm at 0'C for 5 hrs. The filtrate is still clear and transparent. This shows that the effect of winterization is very good.

Remove the plate and frame to form a filter cake with a cake shape and relatively dry. And then heat the filter cake under stirring in a reactor up to 80° C., to make the filter cake (solid fat) melted, and then filter through a plate and frame filter to obtain a filter cake, and blow dry the filter cake with nitrogen, finally recover 117.8 g of a filtrate (solid fat).

It can be seen from it that although the filtrate obtained is 20 ml and kept warm at 0° C. for 5 hrs, it is still clear and transparent. This shows that the effect of winterization is very good. But the yield of the final product is relatively low.

Example 4

Dissolve 2000 g of triglyceride type polyunsaturated fatty acid raw materials obtained by fermentation (EPA 2.9%, DHA 25.3%, a total content of polyunsaturated fatty acid is 30.4%, color orange red) under keeping warm at 30° C. for 1.5 hrs, and then add 2 g of perlite to obtain a mixture. Afterwards, cool the mixture for winterization crystallization to make a temperature lowered to −10° C. within 45 minutes. And then keep warm for crystal growth for 30 minutes. Then add 40 g of diatomite under stirring for 0.5 hrs to obtain a crystalline liquid.

Filter the crystalline liquid containing diatomite and perlite through a centrifugal strainer to obtain a filter cake. No obvious filtrate is seen after 6 minutes. And then blow dry the filter cake with nitrogen. No filtrate droplet is flowed out after 4 minutes. Collect a filtrate and weigh 1964.0 g with the yield of 98.2%.

Take 20 ml of the filtrate and keep warm at 0° C. for 5 hrs. The filtrate is still clear and transparent. This shows that the effect of winterization is very good.

Stop filtration to form a filter cake with a cake shape and relatively dry. And then heat the filter cake under stirring in a reactor up to 40° C. to make solid fat melted, and then filter through a plate and frame filter to obtain a filter cake, and blow dry the filter cake with nitrogen, finally recover 20.3 g of a filtrate (solid fat). The filter cake may be used for the next winterization process.

Example 5

Dissolve 3000 g of free type conjugated linoleic acid raw materials (a content is 69.7%) under keeping warm at 100° C. for 1.0 hr, and then add 15 g of activated clay and 15 g of perlite to obtain a mixture. Afterwards, cool the mixture for winterization crystallization to make a temperature lowered from 100° C. to 5° C. within 60 minutes. Then keep warm for crystal growth for 45 minutes. And then add 15 g of activated clay and 60 g of perlite under stirring for 0.5 hrs to obtain a crystalline liquid.

Filter the crystalline liquid containing activated clay and perlite through a vacuum filter to obtain a filter cake. No obvious filtrate is seen after 6 minutes. And then blow dry the filter cake with nitrogen. No filtrate droplet is flowed out after 3 minutes. Collect a filtrate and weigh 2889.0 g with the yield of 96.3%.

Take 20 ml of the filtrate and keep warm at 0° C. for 5 hrs. The filtrate is still clear and transparent. This shows that the effect of winterization is very good.

Stop filtration to form a filter cake with a cake shape and relatively dry. And then heat the filter cake under stirring in a reactor up to 100° C. to make solid fat melted, and then filter through a vacuum filter to obtain a filter cake, and then blow dry the filter cake with nitrogen, finally recover 87.4 g of a filtrate (solid fat). The filter cake may be used for the next winterization process.

Example 6

Dissolve 2800 g of methyl ester type arachidonic acid raw materials (with 58.3% of a content) under keeping warm at 60° C. for 0.5 hrs, and then add 3.0 g of activated carbon to obtain a mixture. Afterwards, cool the mixture for winterization crystallization to make a temperature lowered to 2° C. within 60 minutes. Then keep warm for crystal growth for 45 minutes. And then add 14 g of activated carbon under stirring for 0.5 hrs until evenly mixing together to obtain a crystalline liquid.

Filter the crystalline liquid containing activated carbon through a vacuum filter to obtain a filter cake. No obvious filtrate is seen after 3 minutes. And then blow dry the filter cake with nitrogen. No filtrate droplet is flowed out after 3 minutes. Collect a filtrate and weigh 2741.2 g with the yield of 97.9%.

Take 20 ml of the filtrate and keep warm at 0° C. for 5 hrs. The filtrate is still clear and transparent. This shows that the effect of winterization is very good.

Stop filtration to form a filter cake with a cake shape and relatively dry. And then heat the filter cake under stirring in a reactor up to 60° C. to make solid fat melted, and then filter through a vacuum filter to obtain a filter cake, and then blow dry the filter cake with nitrogen, finally recover 35.4 g of a filtrate (solid fat). The filter cake may be used for the next winterization process.

Example 7

Dissolve 3500 g of triglyceride type linolenic acid and linoleic acid raw materials (a content of linolenic acid is 10.7%, a content of linoleic acid is 35.6%) under keeping warm at 80° C. for 0.45 hrs, and then add 10 g of diatomite to obtain a mixture. Afterwards, cool the mixture for winterization crystallization to make a temperature lowered to −2.5° C. within 45 minutes. Then keep warm for crystal growth for 45 minutes. And then add 45 g of activated clay and 60 g of perlite under stirring for 0.5 hrs until evenly mixing together to obtain a crystalline liquid.

Filter the crystalline liquid containing diatomite, activated clay and perlite through a pressure filter to obtain a filter cake. No obvious filtrate is seen after 5 minutes. And then blow dry the filter cake with nitrogen. No filtrate droplet is flowed out after 4 minutes. Collect a filtrate and weigh 2741.2 g with the yield of 97.9%.

Take 20 ml of the filtrate and keep warm at 0° C. for 5 hrs. The filtrate is still clear and transparent. This shows that the effect of winterization is very good.

Stop filtration to form a filter cake with a cake shape and relatively dry. And then heat the filter cake under stirring in a reactor up to 100° C. to make solid fat melted, and then filter through a vacuum filter to obtain a filter cake, and then blow dry the filter cake with nitrogen, finally recover 48.9 g of a filtrate (solid fat). The filter cake may be used for the next winterization process.

It is required to be declared that the invention contents and specific examples are intended to prove the practical application of the technical solution provided by the present invention, and shall not be interpreted as a limitation of the protection scope of the present invention. It is easy for any persons skilled in the art to carry out further improvement and perfection not from the spirit and scope of the invention, so the present invention is just limited by the content and scope of claims of the present invention, its intention to cover all included all alternative solutions and equivalent solutions within the spirit and scope of the present invention limited by the appendix claims.

We claim:

1. A method of efficiently separating solid fat from polyunsaturated fatty acid grease, comprising the following steps:

a) adding a small amount of inert solid powder to a heated melted polyunsaturated fatty acid grease, and stirring evenly, wherein the inert solid powder is selected from the group consisting of activated carbon, activated clay, diatomite and perlite, and wherein the polyunsaturated fatty acid grease is selected from the group consisting of fish oil, algal oil, linoleic acid, conjugated linoleic acid, linolenic acid and arachidonic acid;

b) cooling and crystallizing the polyunsaturated fatty acid grease containing the inert solid powder obtained by step a) to a temperature of −10° C. to 5° C., to obtain a crystalline liquid;

c) adding a certain amount of inert solid powder to the crystalline liquid obtained by step b), and stirring evenly, to obtain a solid-liquid mixture;

d) filtering the solid-liquid mixture obtained by step c), to obtain a clarified polyunsaturated fatty acid grease and a filter cake;

e) putting the filter cake obtained by step d) into a reactor and then heating to dissolve, to obtain a solid-liquid mixture containing the inert solid powder; and f) filtering the solid-liquid mixture obtained by step e), to obtain a solid fat filtrate in molten state and a filter cake containing the inert solid powder.

2. The method according to claim 1, wherein the polyunsaturated fatty acid is in the form of methyl esters, ethyl esters, glycerides, or free fatty acids.

3. The method according to claim 1, wherein, in step a), a melting temperature of the polyunsaturated fatty acid grease is 30-100° C.

4. The method according to claim 1, wherein, in step a), before crystallizing, an additive amount of the inert solid powder is 0.1-1.0% (w/w) of a mass of the polyunsaturated fatty acid grease.

5. The method according to claim 1, wherein, in step c), after crystallizing, an additive amount of the inert solid powder is 0.5-4.0% (w/w) of a mass of the polyunsaturated fatty acid grease.

6. The method according to claim 1, wherein, in step e), a temperature of putting the filter cake into the reactor for heating and dissolving is 40-100° C.

7. The method according to claim 1, wherein, in steps d) and f), a mode of the filtration is a plate and frame pressure filtration, a centrifugal filtration or a vacuum filtration.

* * * * *